US009228106B2

(12) United States Patent
Csihony et al.

(10) Patent No.: US 9,228,106 B2
(45) Date of Patent: Jan. 5, 2016

(54) PE WAX DISPERSIONS IN THE COATING OF PLASTICS

(71) Applicant: BASF SE, Ludwigshafen (DE)

(72) Inventors: Szilard Csihony, Weinheim (DE); Ivette Garcia Castro, Ludwigshafen (DE); Heike Pfistner, Ludwigshafen (DE); Eva Wagner, Bad Duerkheim (DE); Pia Baum, Weinheim (DE); Christian Hubert Weidl, Speyer (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 14/147,013

(22) Filed: Jan. 3, 2014

(65) Prior Publication Data

US 2014/0116294 A1   May 1, 2014

Related U.S. Application Data

(62) Division of application No. 13/071,888, filed on Mar. 25, 2011, now Pat. No. 8,652,247.

(60) Provisional application No. 61/317,300, filed on Mar. 25, 2010.

(51) Int. Cl.
*C09D 191/06* (2006.01)
*C09D 123/08* (2006.01)

(52) U.S. Cl.
CPC ............ *C09D 123/08* (2013.01); *C09D 191/06* (2013.01)

(58) Field of Classification Search
None
See application file for complete search history.

(56) References Cited

U.S. PATENT DOCUMENTS

| 3,637,428 A | 1/1972 | Aleckner, Jr. |
| 5,585,192 A | 12/1996 | Sharma et al. |

(Continued)

FOREIGN PATENT DOCUMENTS

| EP | 1 022 294 A1 | 7/2000 |
| GB | 2 456 828 A | 7/2009 |

(Continued)

OTHER PUBLICATIONS

"Ullmann's Encyclopedia of Industrial Chemistry", 5th edition, vols. A 1-A 28: alphabetically arranged articles and vols. B1-B8: basic knowledge, entry heading: Waxes, vol. A 28, p. 146 ff., Verlag Chemie Weinheim, 21 pages.

(Continued)

*Primary Examiner* — Vu A Nguyen
(74) *Attorney, Agent, or Firm* — Oblon, McClelland, Maier & Neustadt, L.L.P.

(57) ABSTRACT

An aqueous paint formulation having an aqueous basecoat and an aqueous dispersion having an at least partially neutralized ethylene copolymer wax, wherein the ethylene copolymer wax contains as comonomers in copolymerized form (A) 12-40 wt % of an ethylenically unsaturated carboxylic acid of formula (I), (B) 60-88 wt % of ethylene, and (C) 0-10 wt % of a further comonomer; or the ethylene copolymer was contains as comonomers in copolymerized form (A') 5-50 wt % of a comonomer of formula (II), (B') 50-95 wt % of ethylene, and (C') 0-20 wt % of a further comonomer; wherein the ethylene copolymer wax comprising the comonomers (A), (B), and optionally (C) has a molecular weight $M_w$ of 10000 to 150000 g/mol, and the ethylene copolymer wax comprising the comonomers (A'), (B'), and optionally (C') has a molecular weight $M_w$ of 5000 to 40000 g/mol.

6 Claims, 1 Drawing Sheet

| | | conc. | | |
|---|---|---|---|---|
| | | 0.5% | 1.0% | 5.0% |
| K.1 | D.1 | | | |
| K.2 | D.2 | | | |
| K.3 | D.3 | | | |

(56) References Cited

U.S. PATENT DOCUMENTS

| | | |
|---|---|---|
| 6,114,021 A | 9/2000 | Pankratz et al. |
| 6,423,775 B1 | 7/2002 | Brune et al. |
| 6,852,792 B1 * | 2/2005 | Capendale et al. ........... 524/556 |
| 2003/0018139 A1 | 1/2003 | Williams et al. |
| 2003/0044626 A1 | 3/2003 | Kim et al. |
| 2006/0257354 A1 | 11/2006 | Fechtenkotter |
| 2007/0087189 A1 * | 4/2007 | Cooper ........................ 428/336 |
| 2009/0258204 A1 | 10/2009 | Stein et al. |

FOREIGN PATENT DOCUMENTS

| | | |
|---|---|---|
| JP | 63-286471 | 11/1988 |
| JP | 2005-146202 | 6/2005 |
| WO | WO 2008/101937 A2 | 8/2008 |
| WO | WO 2011/031558 A2 | 3/2011 |

OTHER PUBLICATIONS

Michael Buback, et al., "Entwicklung eines kontinuierlich betriebenen Hochdruck-Hochtemperatur-Rührkessels mit Licht-Einkopplung", Chem.-Ing.-Tech., 66, No. 4, 1994, pp. 510-513.

International Search Report issued Jun. 1, 2011, in PCT/EP2011/054533 (with English Translation of Category of Cited Documents).

International Search Report and Written Opinion of the International Searching Authority issued Jun. 1, 2011 in patent application No. PCT/EP2011/054533 filed Mar. 24, 2011 with English Translation of Category of Cited Documents.

* cited by examiner

| 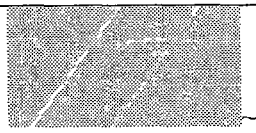 ~(1) | | | | |
|---|---|---|---|---|
| | | conc. | | |
| | | 0.5% | 1.0% | 5.0% |
| K.1 | D.1 |  | 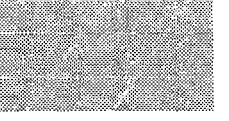 |  |
| K.2 | D.2 | 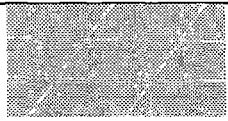 |  |  |
| K.3 | D.3 | 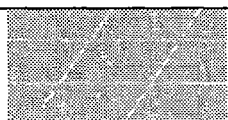 | 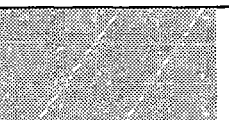 | 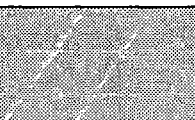 |

PE WAX DISPERSIONS IN THE COATING OF PLASTICS

CROSS REFERENCE TO RELATED APPLICATION(S)

This application is a divisional of U.S. application Ser. No. 13/071,888, filed on Mar. 25, 2011, which incorporates by reference the provisional U.S. application 61/317,300 filed on Mar. 25, 2010.

The invention relates to an aqueous paint formulation comprising at least one aqueous basecoat and at least one aqueous dispersion of at least one specific ethylene copolymer wax, and to the use thereof for coating plastics.

Plastics moldings are used in numerous areas, such as in automobiles, in the household, etc. The painting of plastics moldings often is difficult, since typical coating materials adhere poorly to plastics materials. In particular, the painting of nonpolar plastics materials such as polypropylene (PP) and thermoplastic olefins (TPO) presents difficulties. Consequently, a primer layer comprising an adhesion-promoter system is often applied to the cleaned plastics surface, and this boosts the adhesion between the surface and a basecoat. The formulation used for the primer coat frequently comprises organic solvents and chlorinated polyolefins (CPO). Over the primer coat, the basecoat and, where used, a clearcoat are then applied. In Europe, both basecoat and clearcoat are primarily water-based.

U.S. Pat. No. 3,637,428 describes substrates based on copolymers of ethylene and a polar comonomer, which are coated with a basecoat formulation comprising the film-forming resin, a vinyl acetate polymer as adhesion promoter, and an organic solvent. Disadvantages are the use of an organic solvent and the fact that the coating is suitable only for very specific substrates.

U.S. Pat. No. 5,585,192 describes a water-based formulation for promoting adhesion, comprising a maleinized polyolefin and a polyolefin wax. As a primer coat, the formulation boosts the adhesion between polymer substrates of PP, TPO, and PE, and a basecoat.

For enhancing the adhesion of paints to PP and TPO surfaces, the company Eastman markets the product Advantis® 510W (®=registered trademark), which is an aqueous dispersion of a halogen-free polyolefin adhesion promoter. Advantis® 510W can be mixed directly with aqueous paint formulations based on acrylic or on polyurethane, and applied as a mixture to a plastics substrate.

US-A-20030018139 discloses solventborne and aqueous primer formulations comprising a carboxylated polyolefin which is modified with polyfunctional alcohols. The polyolefin is preferably a propylene-ethylene copolymer grafted with carboxyl-containing monomers, preferably maleic anhydride, and modified fully or partly by reaction with a polyfunctional alcohol. Aqueous emulsions are obtained by neutralizing some of the carboxyl groups with an amine or an inorganic base. The aforementioned reaction products are used as primers, and improve the adhesion of paints to plastics substrates such as TPO. Also described are mixtures of the basecoat with the alcohol-modified, carboxylated polyolefin, which can be applied in this form to a substrate.

On grounds of costs, attempts are increasingly being made to do without the primer coat, while nevertheless ensuring satisfactory adhesion of a waterborne basecoat to a plastics surface.

It is an object of the invention, therefore, to provide improved plastics coatings which meet the aforementioned requirements.

It has now been found that aqueous basecoat formulations which additionally comprise aqueous dispersions based on specific polyethylene copolymer waxes are distinguished by particularly effective promotion of adhesion in the context of the coating of plastics.

The invention accordingly provides an aqueous paint formulation composed of at least one aqueous basecoat and at least one aqueous dispersion of at least one at least partially neutralized ethylene copolymer wax which is selected from ethylene copolymer waxes comprising as comonomers in copolymerized form:

(A) 12% to 40%, preferably 20% to 35%, by weight of at least one ethylenically unsaturated carboxylic acid of the general formula I,

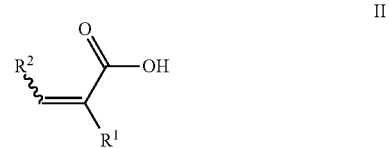

where
$R^1$ and $R^2$ are selected independently of one another from hydrogen and unbranched and branched $C_1$-$C_{10}$alkyl;
(B) 60% to 88%, preferably 80% to 65%, by weight of ethylene;
(C) 0% to 10%, preferably 0% to 5%, by weight of at least one further comonomer; or
(A') 5% to 50%, preferably 20% to 40%, by weight of at least one comonomer of the general formula II

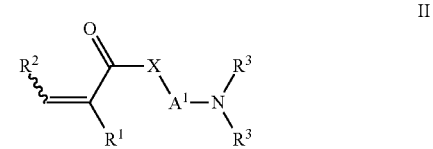

where
$R^1$ and $R^2$ are selected independently of one another from hydrogen and unbranched and branched $C_1$-$C_{10}$alkyl,
$R^3$ is selected independently at each occurrence from hydrogen, unbranched and branched $C_1$-$C_{10}$alkyl, and $C_3$-$C_{12}$cycloalkyl, where two radicals $R^3$ may be joined to one another to form a 3- to 10-membered ring,
X is selected from oxygen, sulfur, and N—$R^4$,
$R^4$ is selected from unbranched and branched $C_1$-$C_{10}$alkyl and hydrogen, and
$A^1$ is a divalent group selected from $C_1$-$C_{10}$alkylene, $C_4$-$C_{10}$cycloalkylene, and phenylene;
(B') 50% to 95% by weight of ethylene, preferably 60% to 80% by weight, and
(C') zero to 20% by weight, preferably zero to 10% by weight, of at least one further comonomer;
where the ethylene copolymer wax comprising the comonomers (A), (B), and optionally (C) has a molecular weight $M_w$ of 10 000 to 150 000 g/mol, and the ethylene copolymer wax comprising the comonomers (A'), (B'), and optionally (C') has a molecular weight $M_w$ of 5000 to 40 000 g/mol.

Comonomers (A), (B), and (C), and (A'), (B'), and (C'), that are comprised in copolymerized form are those fractions of comonomer which are incorporated molecularly into the ethylene copolymer waxes used in accordance with the invention, and add up to 100% by weight.

The fraction of the aqueous ethylene copolymer wax dispersion in the paint formulation of the invention is generally 0.1% to 10%, preferably 0.5% to 5%, more preferably 1% to 3%, by weight, based on the aqueous basecoat.

An ethylene copolymer used in accordance with the invention and comprising comonomer (A') in copolymerized form may be present with partial protonation or as the free amine.

In the formulae I and II the variables are defined as follows:
$R^1$ and $R^2$ are the same or different;
$R^1$ is selected from hydrogen and unbranched and branched $C_1$-$C_{10}$alkyl, such as, for example, methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, n-heptyl, n-octyl, 2-ethylhexyl, n-nonyl, n-decyl; more preferably $C_1$-$C_4$alkyl such as methyl, ethyl, n-propyl, isopropyl, n-butyl, isobutyl, sec-butyl, and tert-butyl, more particularly methyl;
$R^2$ is selected from unbranched and branched $C_1$-$C_{10}$alkyl such as, for example, methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, n-heptyl, n-octyl, 2-ethylhexyl, n-nonyl, n-decyl; more preferably $C_1$-$C_4$alkyl such as methyl, ethyl, n-propyl, isopropyl, n-butyl, isobutyl, sec-butyl, and tert-butyl, particularly methyl, and very preferably hydrogen;
the radicals $R^3$ are different or preferably the same and are selected from hydrogen and branched and preferably unbranched $C_1$-$C_{10}$alkyl such as, for example, methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, n-heptyl, n-octyl, 2-ethylhexyl, n-nonyl, n-decyl; preferably methyl, ethyl, n-propyl, n-butyl, n-pentyl, isopentyl, n-hexyl, n-heptyl, n-octyl, n-nonyl, n-decyl; more preferably $C_1$-$C_4$alkyl such as methyl, ethyl, n-propyl, isopropyl, n-butyl, isobutyl, sec-butyl, and tert-butyl, very preferably methyl;
$C_3$-$C_{12}$cycloalkyl such as, for example, cyclopropyl, cyclobutyl, cyclopentyl, cyclohexyl, cycloheptyl, cyclooctyl, cyclononyl, cyclodecyl, cycloundecyl, and cyclododecyl; preferably cyclopentyl, cyclohexyl, and cycloheptyl
where two radicals $R^3$ may be joined to one another to form a 3- to 10-membered, preferably 5- to 7-membered, ring which is optionally substituted by $C_1$-$C_4$alkyl radicals, with particular preference a group $N(R^3)_2$ may be selected from

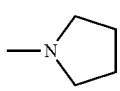 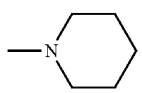 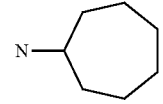

If the radicals $R^3$ are different, then one of the radicals $R^3$ may be hydrogen.

X is selected from sulfur, N—$R^4$, and, in particular, oxygen.

$R^4$ is selected from hydrogen and unbranched and branched $C_1$-$C_{10}$alkyl such as, for example, methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, n-heptyl, n-octyl, 2-ethylhexyl, n-nonyl, n-decyl, preferably hydrogen and $C_1$-$C_4$alkyl such as methyl, ethyl, n-propyl, isopropyl, n-butyl, isobutyl, sec-butyl, and tert-butyl, more preferably methyl, and hydrogen;

$A^1$ is selected from divalent groups such as $C_1$-$C_{10}$alkylene, such as, for example, —$CH_2$—, —$CH(CH_3)$—, —$(CH_2)_2$—, —$CH_2$—$CH(CH_3)$—, cis- and trans-$CH(CH_3)$—$CH(CH_3)$—, —$(CH_2)_3$—, —$CH_2$—$CH(C_2H_5)$—, —$(CH_2)_4$—, —$(CH_2)_5$—, —$(CH_2)_6$—, —$(CH_2)_7$—, —$(CH_2)_8$—, —$(CH_2)_9$—, —$(CH_2)_{10}$—; preferably $C_2$-$C_4$alkylene, such as —$(CH_2)_2$—, —$CH_2$—$CH(CH_3)$—, —$(CH_2)_3$—, —$(CH_2)_4$—, and —$CH_2$—$CH(C_2H_5)$—, more preferably —$(CH_2)_2$—, —$(CH_2)_3$—, and —$(CH_2)_4$—, very preferably —$(CH_2)_2$—; $C_4$-$C_{10}$cycloalkylene such as, for example,

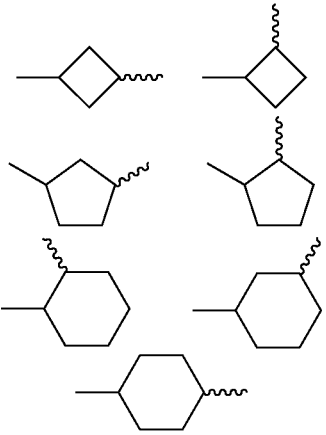

preferably

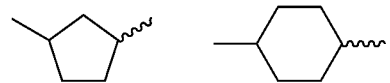

in isomerically pure form or as an isomer mixture, and
phenylene, as for example ortho-phenylene, meta-phenylene, and, with particular preference, para-phenylene.

In one embodiment of the present invention $R^1$ is hydrogen or methyl. Very preferably $R^1$ is methyl.

In one embodiment of the present invention $R^1$ is hydrogen or methyl and $R^2$ is hydrogen. Comonomer (A) very preferably is methacrylic acid.

In one embodiment of the present invention $R^1$ is hydrogen or methyl and $R^2$ is hydrogen, both groups $R^3$ are the same and are in each case methyl or ethyl.

In one embodiment of the present invention X-$A^1$-$N(R^3)_2$ is O—$CH_2$—$CH_2$—$N(CH_3)_2$. Comonomer (A') very preferably is dimethylaminoethyl methacrylate.

In one embodiment of the present invention X-$A^1$-$N(R^3)_2$ is O—$CH_2$—$CH_2$—$CH_2$—$N(CH_3)_2$.

In one embodiment of the present invention comonomer (A') is in protonated form.

In one embodiment of the present invention the ethylene copolymer comprises no further comonomers (C) or (C') in copolymerized form.

In another embodiment of the present invention the ethylene copolymer comprises, in addition to the comonomers (A) and (B), at least one further comonomer (C) as well in copolymerized form, selected from: (c1) ethylenically unsaturated $C_3$-$C_{10}$ carboxylic esters, (c2) ethylenically unsaturated $C_4$-$C_{10}$ dicarboxylic acids or their anhydrides, and (c3) epoxide esters of ethylenically unsaturated $C_3$-$C_{10}$ monocarboxylic acids.

Ethylenically unsaturated $C_3$-$C_{10}$ carboxylic esters (c1) are, for example, methyl (meth)acrylate, ethyl (meth)acrylate, n-butyl (meth)acrylate, n-hexyl (meth)acrylate, 2-ethylhexyl (meth)acrylate, n-octyl (meth)acrylate, n-decyl (meth)acrylate, and/or 2-propylheptyl (meth)acrylate.

Used very preferably as ethylenically unsaturated carboxylic esters (c1) are methyl acrylate and/or methyl methacrylate.

Ethylenically unsaturated $C_4$-$C_{10}$ dicarboxylic acids (c2) include, for example, itaconic acid, mesaconic acid, citraconic acid, fumaric acid, and, in particular, maleic acid. Examples of their anhydrides include itaconic anhydride and, in particular, maleic anhydride.

Examples of epoxide esters of ethylenically unsaturated $C_3$-$C_{10}$ monocarboxylic acids (c3) include, in particular, esters of crotonic acid and/or (meth)acrylic acid with glycidol, preferably glycidyl acrylate and especially glycidyl methacrylate.

Used very preferably as ethylenically unsaturated carboxylic esters (c1) are methyl acrylate and/or methyl methacrylate.

In another embodiment of the present invention the ethylene copolymer comprises, in addition to the comonomers (A') and (B'), at least one further comonomer (C') as well in copolymerized form, selected from:

(c'1) $C_1$-$C_{20}$alkyl esters of ethylenically unsaturated $C_3$-$C_{10}$ monocarboxylic acids, also called, for short, ethylenically unsaturated $C_3$-$C_{20}$ carboxylic esters, examples being methyl (meth)acrylate, ethyl (meth)acrylate, n-butyl (meth)acrylate, n-hexyl (meth)acrylate, 2-ethylhexyl (meth)acrylate, n-octyl (meth)acrylate, n-decyl (meth)acrylate, 2-propylheptyl (meth)acrylate;

(c'2) mono- and di-$C_1$-$C_{10}$alkyl esters of ethylenically unsaturated $C_4$-$C_{10}$ dicarboxylic acids, examples being monomethyl and dimethyl maleate, monoethyl and diethyl maleate, monomethyl and dimethyl fumarate, monoethyl and diethyl fumarate, monomethyl and dimethyl itaconate, mono-n-butyl and di-n-butyl maleate, and mono-2-ethylhexyl and di-2-ethylhexyl maleate;

(c'3) vinyl esters or allyl esters of $C_1$-$C_{70}$ carboxylic acids, preferably vinyl esters or allyl esters of acetic acid or propionic acid, more preferably vinyl propionate and vinyl acetate, and very preferably vinyl acetate;

(c'4) epoxide esters of ethylenically unsaturated $C_3$-$C_{10}$ monocarboxylic acids, more particularly esters of crotonic acid and/or (meth)acrylic acid with glycidol, preferably glycidyl acrylate and especially glycidyl methacrylate; and (c'5) anhydrides of ethylenically unsaturated dicarboxylic acids such as itaconic anhydride and especially maleic anhydride.

The ethylene copolymer formed from the comonomers (A) and (B) or (A') and (B') preferably comprises, as comonomer (C) or (C'), maleic anhydride and/or glycidyl methacrylate.

In one embodiment of the present invention comonomer (A) is in neutralized form.

The ethylene copolymer waxes employed in the dispersions used in accordance with the invention, and comprising the comonomers (A), (B), and, optionally, (C), have in general a melt flow rate (MFR) in the range from 1 to 50 g/10 min, preferably 5 to 20 g/10 min, more preferably 7 to 15 g/10 min, measured at 160° C. under a load of 325 g in accordance with EN ISO 1133. Their acid number is typically 50 to 200 mg KOH/g copolymer, preferably 100 t 200 mg KOH/g copolymer, determined in accordance with DIN 53402.

The molecular weight $M_w$ of the ethylene copolymer waxes employed in the dispersions used in accordance with the invention, and comprising the comonomers (A), (B), and, optionally, (C), is in general from 10 000 to 150 000 g/mol, preferably from 20 000 to 120 000 g/mol, more preferably from 50 000 to 100 000 g/mol.

The melting ranges of the ethylene copolymer waxes employed in the dispersions used in accordance with the invention, and comprising the comonomers (A), (B), and, optionally, (C), are situated in general in the range from 60 to 110° C., preferably in the range from 70 to 90° C., as determined by DSC in accordance with DIN 51007.

The ethylene copolymer waxes employed in the dispersions used in accordance with the invention, and comprising the comonomers (A), (B), and, optionally, (C), may be alternating copolymers or block copolymers or, preferably, gradient or random copolymers.

The molecular weight $M_w$ of the ethylene copolymer waxes employed in the dispersions used in accordance with the invention, and comprising the comonomers (A'), (B'), and, optionally, (C'), is from 5000 to 40 000 g/mol, preferably from 10 000 to 30 000 g/mol, more preferably from 15 000 to 25 000 g/mol.

The melting point of the ethylene copolymer waxes employed in the dispersions used in accordance with the invention, and comprising the comonomers (A'), (B'), and, optionally, (C'), is situated in general in the range from 40 to 100° C., preferably in the range from 40 to 80° C., as determined by DSC in accordance with DIN 51007.

The ethylene copolymer waxes used can be prepared by conventional processes for copolymerizing ethylene (B) or (B'), comonomer (A) or (A'), and, optionally, further comonomers (C) or (C'), in stirred high-pressure autoclaves or in high-pressure tube reactors. Preparation in stirred high-pressure autoclaves is preferred. Stirred high-pressure autoclaves are known: a description is found in, for example, *Ullmann's Encyclopedia of industrial Chemistry*, 5th edition, entry heading: Waxes, volume A 28, p. 146 ft, Verlag Chemie Weinheim, Basel, Cambridge, New York, Tokyo, 1996. The length/diameter ratio of such autoclaves is predominantly in ranges from 5:1 to 30:1, preferably 10:1 to 20:1. The high-pressure tube reactors which may likewise be employed are found likewise in *Ullmann's Encyclopedia of industrial Chemistry*, 5th edition, entry heading: Waxes, volume A 28, p. 146 ff., Verlag Chemie Weinheim, Basel, Cambridge, New York, Tokyo, 1996. Details on the preparation of ethylene copolymer are also given in WO 2008/101937.

The preparation of aqueous dispersions of ethylene copolymer waxes is known per se. A preferred procedure is to place one or more ethylene copolymers in a vessel together with further substances, the vessel being, for example, a flask, an autoclave or a tank, and to heat the contents.

In the case of ethylene copolymer waxes comprising the comonomers (A'), (B'), and, optionally, (C'), one or more Brønsted acids such as, for example, organic acids like glacial acetic acid, formic acid, lactic acid, butyric acid, benzoic acid, methanesulfonic acid, and para-toluenesulfonic acid, or inorganic acids like nitric acid, hydrochloric acid, phosphoric acid, and sulfuric acid, and water, and optionally further substances, examples being emulsifiers, are added, the sequence of addition of Brønsted acid or Brønsted acids and also, where used, further substances being arbitrary.

The amount of Brønsted acid added is such that the ethylene copolymer is in partially or, preferably, fully neutralized form. In one embodiment of the present invention an excess of Brønsted acid is used.

If comonomer (A') in the ethylene copolymer wax comprising the comonomers (A'), (B'), and, optionally, (C') is already in at least partly protonated form, it may not be necessary to add Brønsted acid.

In the case of ethylene copolymer waxes synthesized from the comonomers (A), (B), and, optionally, (C), it is usual to add one or more basic substances, with which the ethylene copolymer waxes are at least partly neutralized, examples being hydroxides and/or carbonates and/or hydrogen carbonates of alkali metals, or preferably amines such as, for example, ammonia and organic amines such as, for example, alkylamines, N-alkylethanolamines, alkanolamines and polyamines. Examples of alkylamines include the following: triethylamine, diethylamine, ethylamine, trimethylamine, dimethylamine, methylamine. Preferred amines are monoalkanolamines, N,N-dialkylalkanolamines, N-alkylalkanolamines, dialkanolamines, N-alkyldialkanolamines, and trialkanolamines having in each case 2 to 18 C atoms in the hydroxyalkyl radical and optionally in each case 1 to 6 C atoms in the alkyl radical, preferably 2 to 6 C atoms in the alkanol radical, and optionally 1 or 2 C atoms in the alkyl radical. Especially preferred are ethanolamine, diethanolamine, triethanolamine, methyldiethanolamine, n-butyldiethanolamine, N,N-dimethylethanolamine, and 2-amino-2-methylpropan-1-ol. Especially preferred are ammonia and N,N-dimethylethanolamine. Examples of polyamines include the following: ethylenediamine, tetramethylethylenediamine (TMEDA), diethylenetriamine, and triethylenetetramine.

In one embodiment of the present invention dispersions of ethylene copolymer waxes used in accordance with the invention and synthesized from the comonomers (A), (B), and, optionally, (C) comprise an amount of basic substance or basic substances such that at least half, preferably at least 60 mol %, of the carboxyl groups in the ethylene copolymer wax or waxes are neutralized.

In one embodiment of the present invention dispersions of ethylene copolymer waxes used in accordance with the invention and synthesized from the comonomers (A), (B), and, optionally, (C) comprise basic substance or basic substances, and more particularly amine, in an amount such that the carboxyl groups of the ethylene copolymer wax or waxes are neutralized quantitatively.

In one embodiment of the present invention dispersions of ethylene copolymer waxes used in accordance with the invention and synthesized from the comonomers (A), (B), and, optionally, (C) may comprise more basic substance or basic substances, more particularly amine, than is or are necessary for complete neutralization of the ethylene copolymer wax or waxes—for example, an excess of up to 100 mol %, preferably up to 50 mol %.

If it is desired to prepare the dispersion in question at a temperature above 100° C., it is advantageous to operate under increased pressure and to select the vessel accordingly. The dispersion formed is homogenized, by mechanical or pneumatic stirring or by shaking, for example. It is advantageously heated to a temperature above the melting point of the ethylene copolymer wax. Heating takes place advantageously to a temperature which is at least 10° C., more advantageous to a temperature which is at least 30° C., above the melting point of the ethylene copolymer wax.

The aqueous dispersions used in accordance with the invention have a solids content in the range from 5% to 40%, preferably 10% to 30%, by weight. The water used for the dispersions is preferably deionized, i.e., purified by distillation or by means of an ion exchanger.

The pH of the aqueous dispersions comprising ethylene copolymer waxes synthesized from comonomers (A), (B), and, optionally, (C) is generally 7 to 14, preferably 8 to 10.

The pH of the aqueous dispersions comprising ethylene copolymer waxes synthesized from comonomers (A'), (B'), and, optionally, (C') is generally 1 to 7, preferably 3 to 6.

The aforementioned aqueous ethylene copolymer wax dispersions are used in accordance with the invention, with typical waterborne basecoat materials, to prepare the aqueous modified paint formulations of the invention. For this purpose, the aforementioned aqueous ethylene copolymer wax dispersions are admixed directly to commercial aqueous paint formulations (i.e., basecoat) based, for example, on polyurethane, polyester, alkyd, melamine and/or polyacrylate resins.

Further provided by the invention is the use of the aqueous modified paint formulations of the invention for coating plastics. The plastics may be moldings from many different sectors. Examples from the automobile sector include, for example, bumpers, tank covers, etc. Examples from the household sector are small appliances, packaging, toys, etc. Examples of plastics materials used for this purpose include polyurethanes, polyamides, polycarbonates, polyesters, and, in particular, nonpolar plastics materials. Examples of the latter are polyolefins such as polyethylene, ethylene copolymers, polypropylene, propylene copolymers, polyolefin mixtures with other polymers, such as PP/EPDM blends, for example, and PVC.

For coating, the cleaned and dried plastics surfaces are provided with the modified basecoat formulation. The substrate may be coated in a variety of ways, for example by dipping, spraying or application of the modified basecoat formulation. Over this basecoat formulation it is then possible to apply a topcoat, generally a clearcoat. The film thickness of the basecoat and of the clearcoat is dependent on the particular application and may vary considerably.

The plastics surfaces provided with the modified basecoat formulation are notable for particularly good adhesion of the paint.

EXAMPLES

Preparation of the Ethylene Copolymers

In a high-pressure autoclave of the type described in the literature (M. Buback et al., Chem. Ing. Tech. 1994, 66, 510), ethylene and either N,N-dimethylaminoethyl methacrylate (DMAEMA) or methacrylic acid (MAA) were copolymerized continuously at temperatures of 200 to 250° C. Ethylene was fed continuously into the high-pressure autoclave under the reaction pressure. Separately from this, the copolymer, optionally diluted with isododecane, was fed continuously into the high-pressure autoclave. Separately from this, the initiator solution, consisting of tert-amyl peroxypivalate dissolved in isododecane, is fed continuously into the high-pressure autoclave. Separately from this, where used, propionaldehyde is fed continuously into the high-pressure autoclave. The pressure during polymerization was 1500 to 2500 bar. This gave ethylene copolymers having the analytical data evident from table 1.

TABLE 1

Analytical data of ethylene copolymers used

| Ex. No. | Amount of ethylene [% by wt.] | Amount of DMAEMA [% by wt.] | Amount of ethylene [% by wt.] | Amount of MAA [% by wt.] | Melting point [° C.] | Mw [g/mol] | η [mPa · s] |
|---|---|---|---|---|---|---|---|
| 1 | 63 | 37 | — | — | 49 | 17 000 | 2600 |
| 2 | 69 | 31 | — | — | 41 | 21 700 | 7100 |
| 3 | — | — | 73 | 27 | 80 | 90 000 | >50 000 |

By "amount" is meant the fraction of copolymerized MAA or DMAEMA, respectively, in the particular ethylene copolymer. The amount of MAA and of N,N-dimethylaminoethyl methacrylate in the ethylene copolymers was determined by $^1$H NMR spectroscopy.

η: Dynamic melt viscosity, measured at 120° C. in a plate/cone viscometer (PP 35 Ti) with a 1.0 mm gap, and D=10 [1/s] in accordance with DIN 53018-1

Preparation of Aqueous Dispersions of the Ethylene Copolymers

A 2-liter autoclave with anchor stirrer was charged in each case with the amount of ethylene copolymer from examples 1 to 3 which is indicated in table 2. This initial charge was heated to 130° C. with stirring and subsequently the amount of acid or amine (feed 1) indicated in table 2 was added dropwise over the course of 15 minutes. Thereafter, over the course of 30 minutes, the remaining amount of water (feed 2) was added, and stirring was continued at 130° C. (external temperature) for 15 minutes. After that the external temperature was lowered to 100° C., the mixture was stirred at 100° C. for an hour, and was then cooled to room temperature over the course of 15 minutes. Filtration through a Perlon filter (100 μm) gave the corresponding aqueous dispersions.

TABLE 2

Ethylene copolymer dispersions

| No. | Copolymer ex. | Amount of (B) [g] | Glacial acetic acid Feed 1 | DMEA Feed 1 | Amount of H$_2$O [g], Feed 2 | pH of emulsion | Solids content [% by wt.] |
|---|---|---|---|---|---|---|---|
| D.1 | 1 | 225 | 32 g in 69 ml H$_2$O | — | 800 | 4.9 | 20 |
| D.2 | 2 | 225 | 28 g in 72 ml H$_2$O | — | 800 | 4.6 | 20 |
| D.3 | 3 | 225 | — | 38 g in 114 ml H$_2$O | 648 | 9.0 | 21 |

Coating of Plastics Surfaces with Modified Basecoat Formulation

Plastics plaques measuring 15×20 cm made from PP/EPDM were cleaned with isopropanol and then dried. Each commercial basecoat formulation comprising PU, melamine, and polyacrylate resins was admixed with the above-described ethylene copolymer dispersions D.1 to D.3 in concentrations of 0.5%/1.0%/5.0% by weight. The cleaned plastics surfaces were coated with each modified basecoat formulation. The surfaces were flamed and coated with a clearcoat. The completed coated plastics, plaques were flamed again. For application of the basecoat formulation, a 90 μm box coater and, for the clearcoat, a 100 μm rod coater were used. This gave an overall dry film thickness of 70 μm. As a control, a plastics plaque was coated only with the basecoat formulation without addition of the above-described ethylene copolymer dispersions and clearcoat.

The plaques were scored with a knife in two parallel lines both horizontally and vertically. The quality of the adhesion was tested in accordance with DIN 55662 in a steam jet test. The results of the steam jet test have been summarized in FIG. 1. FIG. 1 shows, in table form, images of the plastics plaques thus treated. For purposes of comparison, the aforementioned control (1) is shown above the table. In the columns of the table, the respective concentration (conc.) of the ethylene copolymer dispersions in the basecoat formulation is indicated in % by weight. In the rows of the table (K.1 to K.3), the ethylene copolymer dispersion used in each case (D.1 to D.3) is indicated.

FIG. 1 shows that the modified basecoat formulations used in accordance with the invention significantly increase the adhesion to the plastics plaque. Particularly good adhesion was obtained with basecoat formulations comprising D.1.

The invention claimed is:

1. An aqueous paint formulation, comprising an aqueous basecoat and an aqueous dispersion comprising an at least partially neutralized ethylene copolymer wax, the ethylene copolymer wax comprising as comonomers in copolymerized form:
   (A) 20% to 35% by weight of an ethylenically unsaturated methacrylic acid;
   (B) 60% to 80% by weight of ethylene; and
   (C) 0% to 10% by weight of a further comonomer,
   wherein the ethylene copolymer wax comprising the comonomers (A), (B), and optionally (C) has a molecular weight $M_w$ of from 10,000 to 150,000 g/mol, and
   the basecoat is at least one selected from the group consisting of a polyurethane resin, polyester resin, alkyd resin, melamine resin, and polyacrylate resin,
   and wherein a fraction of the aqueous dispersion of the ethylene copolymer wax is 0.1% to 10% by weight, based on the aqueous basecoat, and a solids content of the aqueous dispersion is from 5 to 40%.

2. The paint formulation according to claim 1, wherein the ethylene copolymer wax comprises no further comonomer (C).

3. The paint formulation according to claim 1, wherein the ethylene copolymer comprises maleic anhydride, glycidyl methacrylate, or both, as the further comonomer (C).

4. A process for coating plastics, the process comprising applying the aqueous paint formulation of claim 1 to a plastic.

5. The process according to claim 4, wherein the plastic is a plastic molding from the automobile sector, the household sector, or both sectors.

6. The paint formulation according to claim 1, wherein the ethylene copolymer wax comprising the comonomers (A), (B), and optionally (C) has a molecular weight $M_w$ of from 50,000 to 150,000 g/mol.

* * * * *